United States Patent
Wilkinson et al.

(10) Patent No.: US 8,325,136 B2
(45) Date of Patent: Dec. 4, 2012

(54) COMPUTER DISPLAY POINTER DEVICE FOR A DISPLAY

(75) Inventors: Aaron C. Wilkinson, Plano, TX (US); Michael C. Menefee, Richardson, TX (US)

(73) Assignee: Raytheon Company, Waltham, MA (US)

( * ) Notice: Subject to any disclaimer, the term of this patent is extended or adjusted under 35 U.S.C. 154(b) by 552 days.

(21) Appl. No.: 12/628,852

(22) Filed: Dec. 1, 2009

(65) Prior Publication Data
US 2011/0128221 A1 Jun. 2, 2011

(51) Int. Cl.
G06F 3/033 (2006.01)
G09G 5/08 (2006.01)
(52) U.S. Cl. .................................. 345/158
(58) Field of Classification Search .......... 345/158, 345/156, 166; 382/103, 100, 154; 348/335, 348/144, 115
See application file for complete search history.

(56) References Cited

U.S. PATENT DOCUMENTS

| | | | |
|---|---|---|---|
| 3,230,819 A * | 1/1966 | Noxon | 359/482 |
| 3,614,314 A * | 10/1971 | Rossire | 348/115 |
| 6,091,354 A * | 7/2000 | Beckner et al. | 342/22 |
| 7,158,118 B2 | 1/2007 | Liberty | |
| 7,202,815 B2 * | 4/2007 | Swope et al. | 342/427 |
| 7,227,526 B2 | 6/2007 | Hildreth et al. | |
| 7,340,077 B2 | 3/2008 | Gokturk et al. | |
| 7,348,963 B2 | 3/2008 | Bell | |
| 7,379,559 B2 | 5/2008 | Wallace et al. | |
| 7,421,093 B2 | 9/2008 | Hildreth et al. | |
| 7,489,298 B2 | 2/2009 | Liberty et al. | |
| 7,598,942 B2 | 10/2009 | Underkoffler et al. | |
| 7,623,115 B2 | 11/2009 | Marks | |
| 7,627,139 B2 | 12/2009 | Marks et al. | |
| 2003/0048357 A1 * | 3/2003 | Kain et al. | 348/144 |
| 2004/0063481 A1 | 4/2004 | Wang | |
| 2004/0140955 A1 | 7/2004 | Metz | |
| 2005/0117045 A1 | 6/2005 | Abdellatif et al. | |
| 2006/0033713 A1 | 2/2006 | Pryor | |
| 2007/0120996 A1 | 5/2007 | Boillot | |
| 2008/0056536 A1 | 3/2008 | Hildreth et al. | |
| 2008/0056561 A1 | 3/2008 | Sawachi | |
| 2008/0070684 A1 | 3/2008 | Haigh-Hutchinson | |
| 2008/0187178 A1 | 8/2008 | Shamaie | |
| 2008/0219502 A1 | 9/2008 | Shamaie | |
| 2008/0273755 A1 | 11/2008 | Hildreth | |
| 2009/0027337 A1 | 1/2009 | Hildreth | |
| 2009/0051648 A1 | 2/2009 | Shamaie | |

OTHER PUBLICATIONS

Kölsch, Turk and Höllerer, *The HandVu vision-based hand gesture*; http://ilab.cs.ucsb.edu.projects/mathias/handvu_ilab.html; 2 pages, download Dec. 29, 2009.

(Continued)

*Primary Examiner* — Fred Tzeng
(74) *Attorney, Agent, or Firm* — Schwegman Lundberg & Woessner, P.A.; Gregory J. Gorrie

(57) ABSTRACT

According to one embodiment, a computer display pointer device includes an image processor coupled to a display and a video camera. The display is configured to be worn by a user and display a computer image over a portion of the user's field-of-view. The video camera is operable to be worn by the user and boresighted to a field-of-view of the user. The image processor receives a video signal from the video camera that includes an image of a pointer element configured on a hand of the user, determines a position of the pointer element according to the received video image, and moves a cursor on the display according to the position of the pointer element.

26 Claims, 2 Drawing Sheets

OTHER PUBLICATIONS

*The HandVu*; http://www.movesinstitute.org; 4 pages, download Dec. 29, 2009.

*Pattie Maes and Pranav Mistry demo SixthSense*; http://www.ted.com/talks/patti_maes_demos_the_sixth_sense.html; 3 pages, download Dec. 29, 2009.

* cited by examiner

COMPUTER DISPLAY POINTER DEVICE FOR A DISPLAY

TECHNICAL FIELD OF THE DISCLOSURE

This disclosure generally relates to computing devices, and more particularly, to a computer display pointer device for a display and a method of using the same.

BACKGROUND OF THE DISCLOSURE

Head mounted displays (HMDs) are devices that may be worn by a user and include a computer display that is positioned in front of the user's eyes. Head mounted displays may be particularly useful for users who operate in conditions where ready access to information provided by conventional computing displays are generally not available. Military soldiers, for example, may benefit by the use of head mounted displays in that information they provide may enhance the safety of their personal well-being or the success of their mission.

SUMMARY OF THE DISCLOSURE

According to one embodiment, a computer display pointer device includes an image processor coupled to a display and a video camera. The display is configured to be worn by a user and display a computer image over a portion of the user's field-of-view. The video camera is operable to be worn by the user and boresighted to a field-of-view of the user. The image processor receives a video signal from the video camera that includes an image of a pointer element configured on a hand of the user, determines a position of the pointer element according to the received video image, and moves a cursor on the display according to the position of the pointer element.

Some embodiments of the disclosure may provide numerous technical advantages. For example, one embodiment of the computer display pointer device may provide improved situational awareness (SA) for users performing important operations, such as those piloting aircraft or military personnel whose livelihood may be dependent upon timely responses to changes in battlefield conditions. The computer display pointer device uses a monocular display that only covers a portion of the user's field-of-view so that a relatively large portion of his or her field-of-view is free to view, with the naked eye, imagery of the surrounding environment. Thus, certain embodiments incorporating a monocular display may be generally free of performance limitations posed by conventional head mounted displays incorporating binocular displays that do not allow simultaneous view of the surrounding environment with the naked eye.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

It should be understood at the outset that, although example implementations of embodiments are illustrated below, various embodiments may be implemented using any number of techniques, whether currently known or not. The present disclosure should in no way be limited to the example implementations, drawings, and techniques illustrated below. Additionally, the drawings are not necessarily drawn to scale.

Head mounted displays (HMDs) may provide useful information to their users in an ergonomic manner. Head mounted displays generally include a relatively small computer display that displays information within the user's field-of-view. Head mounted displays may improve situational awareness (SA) for military personnel, such as ground soldiers or pilots of aircraft by displaying useful information within their field-of-view.

Because the computer display of a head mounted display is worn on the head of its user, images displayed thereon may be aligned with those of the surrounding environment. For example, head mounted displays used by military personnel may include helmet mounted sights for "sighting in" enemy targets. To deploy armament using conventional head mounted displays, however, may still require actuation using mechanisms configured separately from the computer display configured on the head mounted display. Thus, the teachings of the present disclosure recognize that certain embodiments may provide a computer display for a head mounted display or other similar device that allows user interaction with information provided by the computer display.

Figure 1:
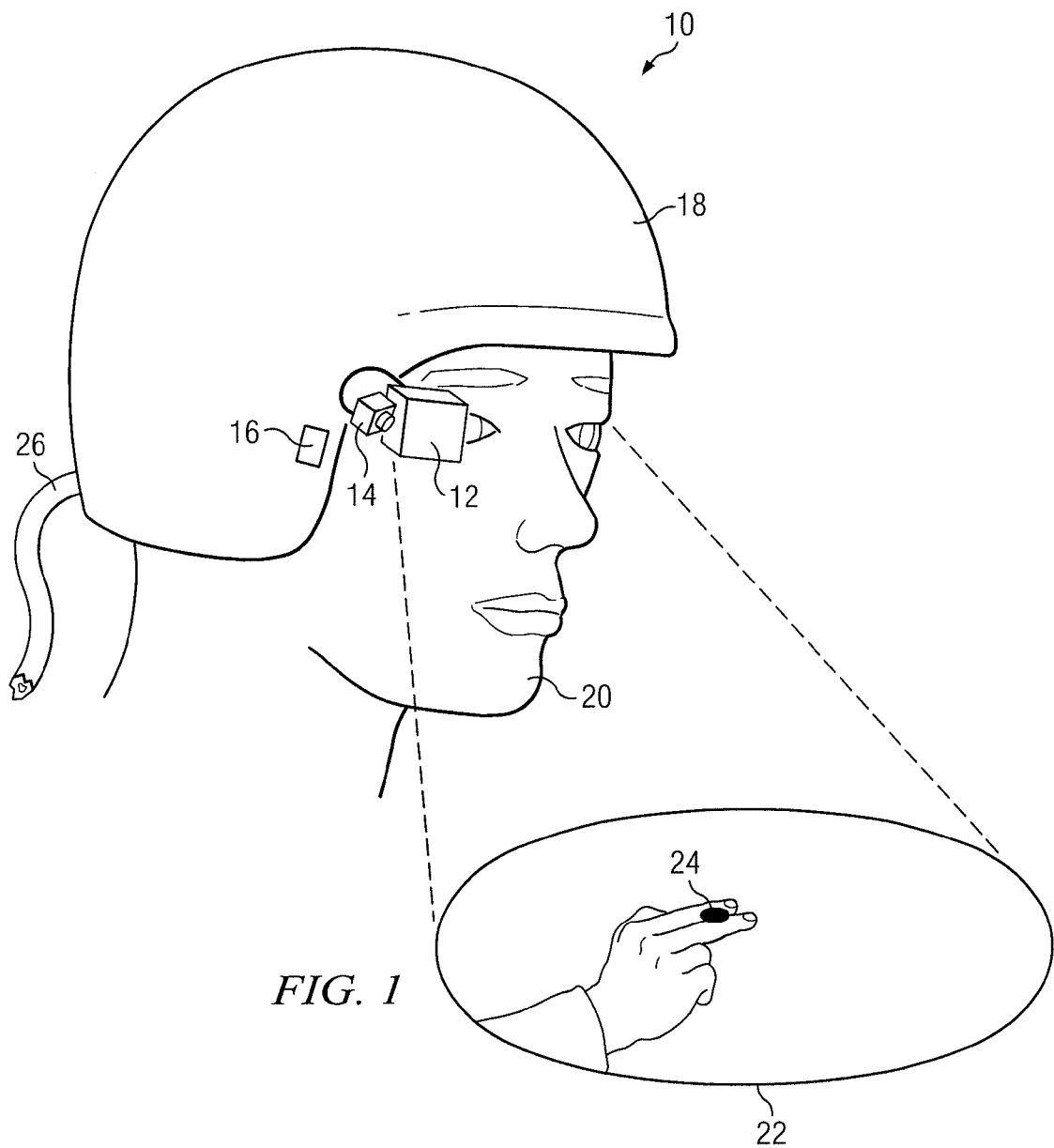
FIG. 1 is an illustration showing one embodiment of a head mounted display that may benefit from the teachings of the present disclosure.

FIG. 1 is an illustration showing one embodiment of a head mounted display 10 that may benefit from the teachings of the present disclosure. Head mounted display 10 includes a monocular display 12, a camera 14, and an image processor 16 that are configured on a helmet 18. Monocular display 12 is configured to be worn by a user 20 and covers a portion of the user's field-of-view 22. Camera 14 is boresighted to the portion of the user's field-of-view covered by monocular display 12. As will be described in detail below, image processor 16 detects, using imagery provided by camera, movements of one or more pointer elements 24 configured on the user's hand to actuate certain elements displayed by monocular display 12.

In the particular embodiment shown, monocular display 12, camera 14, and image processor 16 are configured on a helmet 18 that may be used by a military ground soldier. In other embodiments, monocular display 12, camera 14, and image processor 16 may be configured on any type of apparatus that orients monocular display 12 and camera 14 in a generally fixed orientation relative to the user's field-of-view 22. For example, monocular display 12, camera 14, and image processor 16 may be configured on a headband that positions monocular display 12 and camera 14 at a relatively fixed orientation on the user's head. As another example, monocular display 12, camera 14, and image processor 16 may be configured on other types of helmets, such as those used by pilots of aircraft. Although monocular display 12 as shown and described is adapted to cover a portion of one eye of the user, other embodiments may use other types of displays, such as those that cover a portion of both eyes.

Image processor 16 receives imagery generated by camera 14 to detect movement of pointer element 24. Pointer element 24 may include any type of device that provides visual contrast to other objects that may exist within the camera's field-of-view. For example, in one embodiment, pointer element 24 may include a light emitting diode (LED) that emits light at a color, such as red, that is generally different from other objects typically within the user's field-of-view 22. In another embodiment, pointer element 24 may be an infrared light source that emits radiation in the infrared spectrum such that camera 14, which comprises infrared detecting capability, may detect the position of the infrared light source while in the camera's field-of-view. In yet another embodiment, pointer element 24 may include a portion of a glove in which certain region(s) are covered with a fluorescing material, such as strontium-oxide-aluminate.

Coupling of other systems to image processor 16 external to helmet 18 may be provided by a cable 26. For example, cable 26 may be coupled to one or more computing system external to helmet 18. Cable 26 may also provide communication of pointer element 24 movement detected by image processor 16 to other systems external to helmet 18. For example, cable 26 may couple image processor 16 to one or more armament systems configured on a ground assault vehicle such that image processor 16 may be used to actuate its armament according to detected movements of pointer element 24. In other embodiments, image processor 16 may communicate with other systems external to helmet 18 using a wireless communication signals, such as radio-frequency (RF) signals, or infrared signals.

Figure 2:
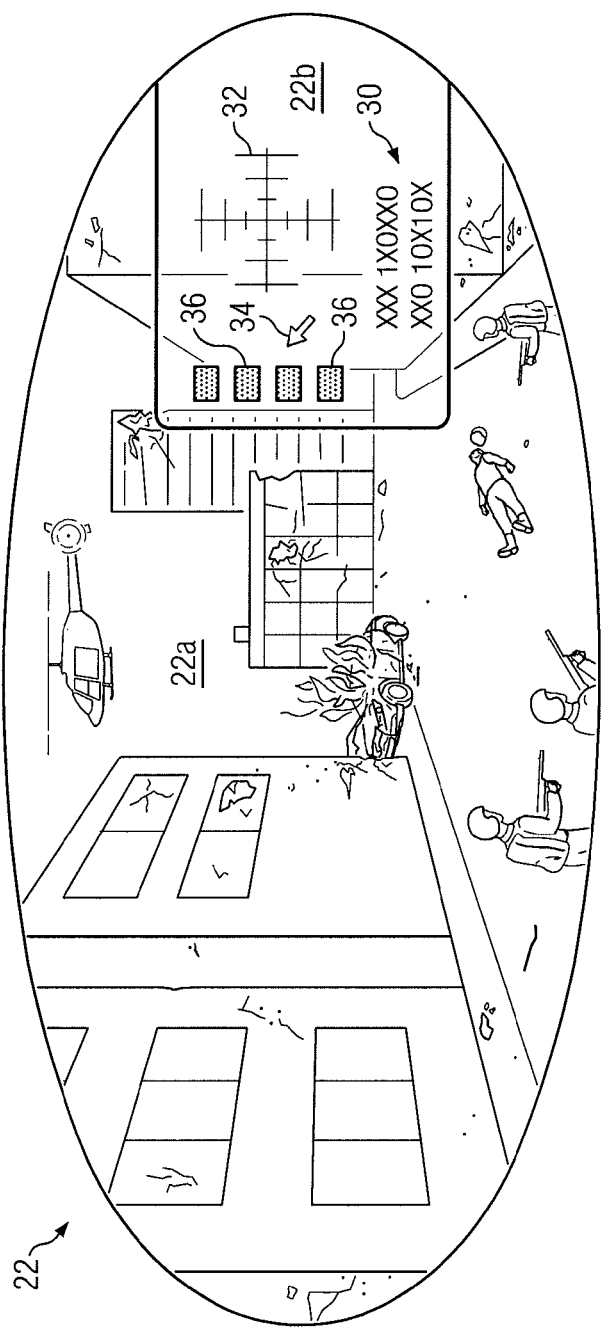
FIG. 2 is an illustration showing an example field-of-view that may be viewed by a user of the head mounted display of FIG. 1.

FIG. 2 is an illustration showing an example field-of-view 22 that may be viewed by a user of head mounted display 10. Field-of-view 22 includes a normal view region 22a that is viewed by the user's naked eye, and a display field-of-view 22b provided by monocular display 12. Monocular display 12 is shown displaying various display elements, such as an alpha-numeric text element 30, a graphic element 32, a cursor 34, and one or more selectable icons 36.

Although monocular display 12 is shown displaying alpha-numeric text element 30, a graphic element 32, a cursor 34, and selectable icons 36, monocular display 12 may display any type of information that may be useful to its user. For example, monocular display 12 may display metadata associated with various objects detected in the display field-of-view 22b or other systems external to the helmet 18.

Image processor 16 may actuate certain signals by detecting specified hand gestures made by the user. In one embodiment, the user may wear a glove configured with two pointer elements 24: one on the index finger and the other on the ring finger. Image processor 16 may detect changes in the relative position of one pointer element 24 relative to the other pointer element 24 to generate the actuating signal. Thus, image processor 16 may generate actuating signals according certain hand gestures of the user wearing the glove, such as a sharp twist of the wrist, or a snap of the fingers.

In the particular embodiment shown, each selectable icon 36 represents a certain operation to be performed when actuated. Selectable icons 36 may be actuated by movement of cursor 34 onto a desired selectable icon 36 followed by an actuating signal generated by image processor 16. Movement of cursor 34 may be provided by image processor 16 that detects the position of pointer elements 24 and adjusts the position of cursor 34 on monocular display 12 to match that of the position of pointer elements 24. Once cursor 34 has been moved over a desired selectable icon 36, it may be actuated by a characteristic hand gesture performed by the user's hand.

As an example, graphic element 32 may be a cross-hairs display element that is used to sight in a surface-to-air (SAM) missile configured on a ground assault vehicle in which one selectable icon 36 represents a trigger that launches the missile towards a location indicated by the cross-hairs display element. In use, the user may look towards an enemy target in order to orient the cross-hairs display element over the enemy target. When accomplished, the user may manipulate the pointer elements 24 on his hand so that cursor 34 is moved over the actuating element 36 representing the trigger of the missile. The missile may then be triggered by a characteristic movement of the user's hand, which causes image processor 16 to detect an actuating signal and thus trigger the missile.

In one embodiment, camera 14 may be boresighted with the user's field-of-view 22 such that imagery generated by camera 14 may be superimposed on monocular display 12 with other display elements, such as alpha-numeric text element 30, graphic element 32, cursor 34, and/or actuating elements 36. In this manner, display elements may achieve the illusion of being suspended within the user's field-of-view 22. Certain embodiments of head mounted display 10 in which imagery generated by camera 14 is superimposed on display 12 may provide an advantage in that the user may be provided with situational awareness of objects that would otherwise be obstructed by monocular display 12. Also, display elements may be associated with real-world objects within the user's field-of-view 22. For an example in which head mounted display 10 is configured on a military aircraft, a graphic element 32 such as a cross-hair display may be used to align a target with an armament device configured on the military aircraft.

Figure 3:
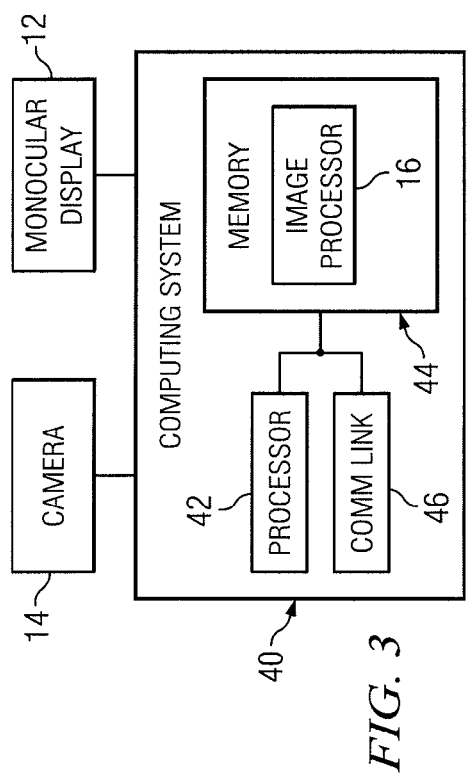
FIG. 3 is a diagram showing several components of the head mounted display of FIG. 1.

FIG. 3 is a diagram showing several components of the head mounted display 10 of FIG. 1. Head mounted display 10 includes a computing system 40 having a processor 42, a memory 44 storing image processor 16, and an optional communication link 46 that couples the image processor 16 to other systems external to head mounted display 10. Image processor 16 processes imagery generated by camera 14 to detect the position of one or more pointer elements 24 within the camera's field-of-view 22 and position cursor 34 at the detected position.

Image processor 16 includes instructions stored in memory 44 and executable on processor 42. Image processor 16 may detect the position of pointer elements 24 according to various image characteristics, such as contrasting color, sharpness, and/or brightness intensity of pointer elements 24 relative to other objects within the camera's field-of-view 22. For example, image processor 16 may determine the position of pointer elements 24 according to information in the video signal from camera 14 representing a specified color and its associated position within the camera's field-of-view 22. Image processor 16 may then display cursor 34 at the determined position.

In one embodiment, image processor 16 may detect position of pointer elements 24 according to their sharpness relative to other objects within the camera's field-of-view 22. To this end, camera 14 may be configured with a lens that is adjusted to provide a focal point that may approximate the nominal distance of the user's hand from camera 14, which may be for example, approximately 1.5 to 3.0 feet in length. Thus, the image of the user's hand may have a relatively good sharpness compared to other objects that may be closer or further away.

Computing system 40 may be may generally be adapted to execute any of the known OS2, UNIX, Mac-OS, Linux, and Windows Operating Systems or other operating systems. Although computing system 40 is shown including a processor 42, a memory 44, and a communication link 46, other embodiments of computing system 40 may include more, less, or other component parts.

Embodiments of Image processor 16 may include logic contained within a medium. Logic may include hardware, software, and/or other logic. Logic may be encoded in one or more tangible media and may perform operations when executed by processor 42. Certain logic, such as its processor, may manage the operation of computing system 40. Examples of processor 42 may include one or more microprocessors, an application specific integrated circuit (ASIC), a field programmable gate array (FPGA), one or more applications, and/or other logic. Certain logic may include a computer program, software, computer executable instructions, and/or instructions capable being executed by computing system 40. In particular embodiments, the operations of the embodiments may be performed by one or more computer readable media storing, embodied with, and/or encoded with a computer program and/or having a stored and/or an encoded computer program. The logic may also be embedded within any other suitable medium without departing from the scope of the invention.

Memory 44 may comprise one or more tangible, computer-readable, and/or computer-executable storage medium. Suitable examples may include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Although the illustrated embodiment provides one embodiment of a computing system 40 that may be used with other embodiments, such other embodiments may additionally utilize computing systems other than general purpose computers as well as general purpose computers without conventional operating systems. Additionally, certain embodiments of computing system 40 may also employ multiple computing systems networked together in a computer network. For example, a particular computing system may include multiple computing systems that are networked together through an local area network (LAN) or an intranet. Embodiments may also be used with a combination of separate computer networks each linked together by a private or a public network.

Modifications, additions, or omissions may be made to head mounted display 10 without departing from the scope of the invention. The components of head mounted display 10 may be integrated or separated. For example, image processor 16 may by physically configured on helmet 18 or may be configured external to helmet 18 such that it controls operation of pointer element 24 using telemetry signals transmitted to and received from camera 14 and monocular display 12. Moreover, the operations of head mounted display 10 may be performed by more, fewer, or other components. For example, image processor 16 may also be configured to detect other types of imagery within the camera's field-of-view 22, such as enemy targets when head mounted display 10 is used in a military context. Additionally, operations of controller circuit 14 may be performed using any suitable logic comprising software, hardware, and/or other logic. As used in this document, "each" refers to each member of a set or each member of a subset of a set.

Although the present invention has been described with several embodiments, a myriad of changes, variations, alterations, transformations, and modifications may be suggested to one skilled in the art, and it is intended that the present invention encompass such changes, variations, alterations, transformation, and modifications as they fall within the scope of the appended claims.

What is claimed is:

1. A computer display pointer device comprising:
an image processor coupled to a display and a video camera, the display configured to be worn by a user and display a computer image over a portion of the user's field-of-view, the video camera operable to the worn by the user and boresighted to a field-of-view of the user;
the image processor operable to:
receive a video signal from the video camera, the video signal including an image of a pointer element configured on a hand of the user;
determine a position of the pointer element according to the received video image; and
actuate a signal according to the determined position of the pointer element.

2. The computer display pointer device of claim 1, wherein the image processor is operable to move a cursor on the display according to the determined position of the pointer element.

3. The computer display pointer device of claim 1, wherein the video signal includes an image of two pointer elements configured on the hand of the user, the image processor operable to actuate the signal according to the relative position of the two pointer elements.

4. The computer display pointer device of claim 3, wherein the image processor is operable to display a selectable icon on the display, and actuate the signal according to the position of the cursor relative to that of the selectable icon.

5. The computer display pointer device of claim 1, wherein the video camera comprises an infrared camera that is sensitive to infrared light and the pointer element is operable to transmit infrared light.

6. The computer display pointer device of claim 1, wherein the image processor, the display, and the video camera are mounted on a helmet.

7. The computer display pointer device of claim 6, wherein the user is a ground soldier and the helmet is configured to be worn by the ground soldier.

8. The computer display pointer device of claim 1, wherein the image processor is operable to display one or more display elements on the display and superimpose imagery generated by the video camera on the display with the one or more display elements.

9. The computer display pointer device of claim 8, wherein the display comprises a monocular display.

10. A computer display pointing method comprising:
receiving a video signal from a video camera operable to the worn by a user, the video signal including an image of a pointer element configured on a hand of the user;
determining a position of the pointer element according to the received video image; and
actuating a signal according to the determined position of the pointer element on a display, the display configured to be worn by a user and boresighted to the user's field-of-view.

11. The method of claim 10, further comprising moving a cursor on the display according to the determined position of the pointer element.

12. The method of claim 10, further comprising actuating the signal according to a relative position of two pointer elements configured on the hand of the user.

13. The method of claim 12, further comprising:
displaying a selectable icon on the display; and
actuating the signal according to the position of the cursor relative to that of the selectable icon.

14. The method of claim 10, wherein receiving the video signal from the video camera comprises receiving the video signal from an infrared camera representing infrared light transmitted by the pointer element.

15. The method of claim 10, further comprising providing the image processor, the display, and the video camera that are mounted on a helmet.

16. The method of claim 15, wherein the user is a ground soldier and the helmet is configured to be worn by the ground soldier.

17. The method of claim 10, further comprising:
displaying one or more display elements on the display; and
superimposing imagery generated by the video camera on the display with the one or more display elements.

18. The method of claim 17, wherein the display comprises a monocular display.

19. A head mounted display comprising:
a display configured to be worn by a user and display a computer image over a portion of the user's field-of-view;
a video camera operable to the worn by the user and bore-sighted to the field-of-view of the user; and
an image processor coupled to the display and the video camera, the image processor operable to:
receive a video signal from the video camera, the video signal including an image a pointer element configured on the hand of the user;
determine a position of the pointer element according to the received video image; and
actuate a signal according to the determined position of the pointer element.

20. The head mounted display of claim 19, wherein the image processor is operable to move a cursor on the display according to the determined position of the pointer element.

21. The head mounted display of claim 19, wherein the video signal includes an image of two pointer elements configured on the hand of the user, the image processor operable to actuate the signal according to the relative position of the two pointer elements.

22. The head mounted display of claim 21, wherein the image processor is operable to display a selectable icon on the display, and actuate the signal according to the position of the cursor relative to that of the selectable icon.

23. The head mounted display of claim 19, wherein the video camera comprises an infrared camera that is sensitive to infrared light and the pointer element is operable to transmit infrared light.

24. The head mounted display of claim 23, wherein the user is a ground soldier and the helmet is configured to be worn by the ground soldier.

25. The head mounted display of claim 19, wherein the image processor is operable to display one or more display elements on the display and superimpose imagery generated by the video camera on the display with the one or more display elements.

26. The head mounted display of claim 25, wherein the monocular display comprises a monocular display.

* * * * *

UNITED STATES PATENT AND TRADEMARK OFFICE
CERTIFICATE OF CORRECTION

| | | |
|---|---|---|
| PATENT NO. | : 8,325,136 B2 | Page 1 of 1 |
| APPLICATION NO. | : 12/628852 | |
| DATED | : December 4, 2012 | |
| INVENTOR(S) | : Wilkinson et al. | |

It is certified that error appears in the above-identified patent and that said Letters Patent is hereby corrected as shown below:

In the Specification

In column 5, line 1, delete "Image" and insert --image--, therefor

In column 5, line 56-57, delete "controller circuit" and insert --camera--, therefor In the Claims In column 6, line 7, in Claim 1, delete "user;" and insert --user,--, therefor In column 7, line 26, in Claim 19, delete "an image a pointer" and insert --an image of a pointer--, therefor Signed and Sealed this
Eleventh Day of November, 2014

Michelle K. Lee
*Deputy Director of the United States Patent and Trademark Office*